United States Patent [19]

Barall

[11] Patent Number: 4,860,006
[45] Date of Patent: Aug. 22, 1989

[54] HEARTBEAT COLLISION AVOIDANCE METHOD AND CIRCUIT

[76] Inventor: Michael Barall, 896 Middle Ave., Apt. #4, Menlo Park, Calif. 94025

[21] Appl. No.: 274,655

[22] Filed: Nov. 21, 1988

Related U.S. Application Data

[63] Continuation of Ser. No. 871,460, Jun. 5, 1986, abandoned.

[51] Int. Cl.[4] .............................................. H04Q 1/00
[52] U.S. Cl. ....................... 340/825.500; 340/825.520; 370/85
[58] Field of Search .................. 340/825.06–825.14, 340/825.2, 825.5, 825.52, 825.65–825.68; 370/85, 86, 89, 90, 95, 96, 100, 106, 107

[56] References Cited

U.S. PATENT DOCUMENTS

| | | | |
|---|---|---|---|
| 3,856,993 | 12/1974 | Closs et al. | 370/86 X |
| 4,313,196 | 1/1982 | Oblonsky | 370/85 |
| 4,320,502 | 3/1982 | de Veer | 370/85 |
| 4,380,761 | 4/1983 | Boggs . | |
| 4,412,342 | 10/1983 | Khan et al. . | |
| 4,454,508 | 6/1984 | Grow . | |

OTHER PUBLICATIONS

Derfler, Jr. and Stallings, The IBM Token Ring LAN, PC Magazine, Mar. 11, 1986.

*Primary Examiner*—Ulysses Weldon
*Attorney, Agent, or Firm*—Donald L. Beeson

[57] ABSTRACT

A heartbeat collision avoidance method and system regulates the access of two or more computers to the data communications path of the local area network by allocating unique transmission slot times to each of the computers on the network in reference to the heartbeat signal which is generated independently of a data transmission. The transmission slot time of each station of the network is determined by initiating a timeout counter circuit which is triggered by the heartbeat signal and which times out at differing times in accordance with a unique address assigned to each of the network stations. The station is permitted to commence a transmission at its slot time provided the time interval between the slot time and the end of the last data transmission exceeds a predetermined interframe spacing interval. In one aspect of the invention the heartbeat signal which triggers the timeout counter circuits associated with each station is generated by a network master station which has the highest station address.

24 Claims, 5 Drawing Sheets

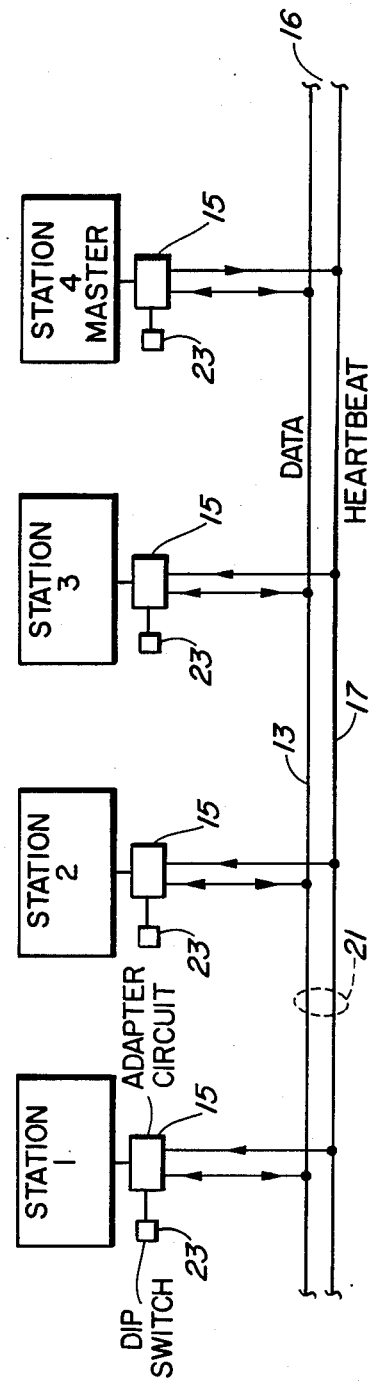
FIG._1.
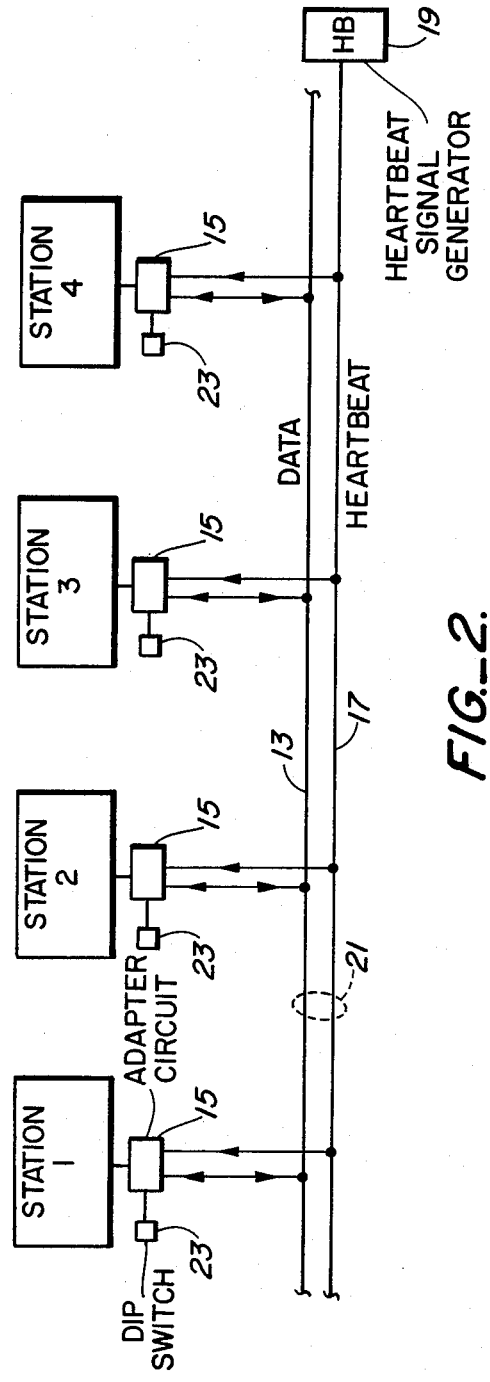
FIG._2.

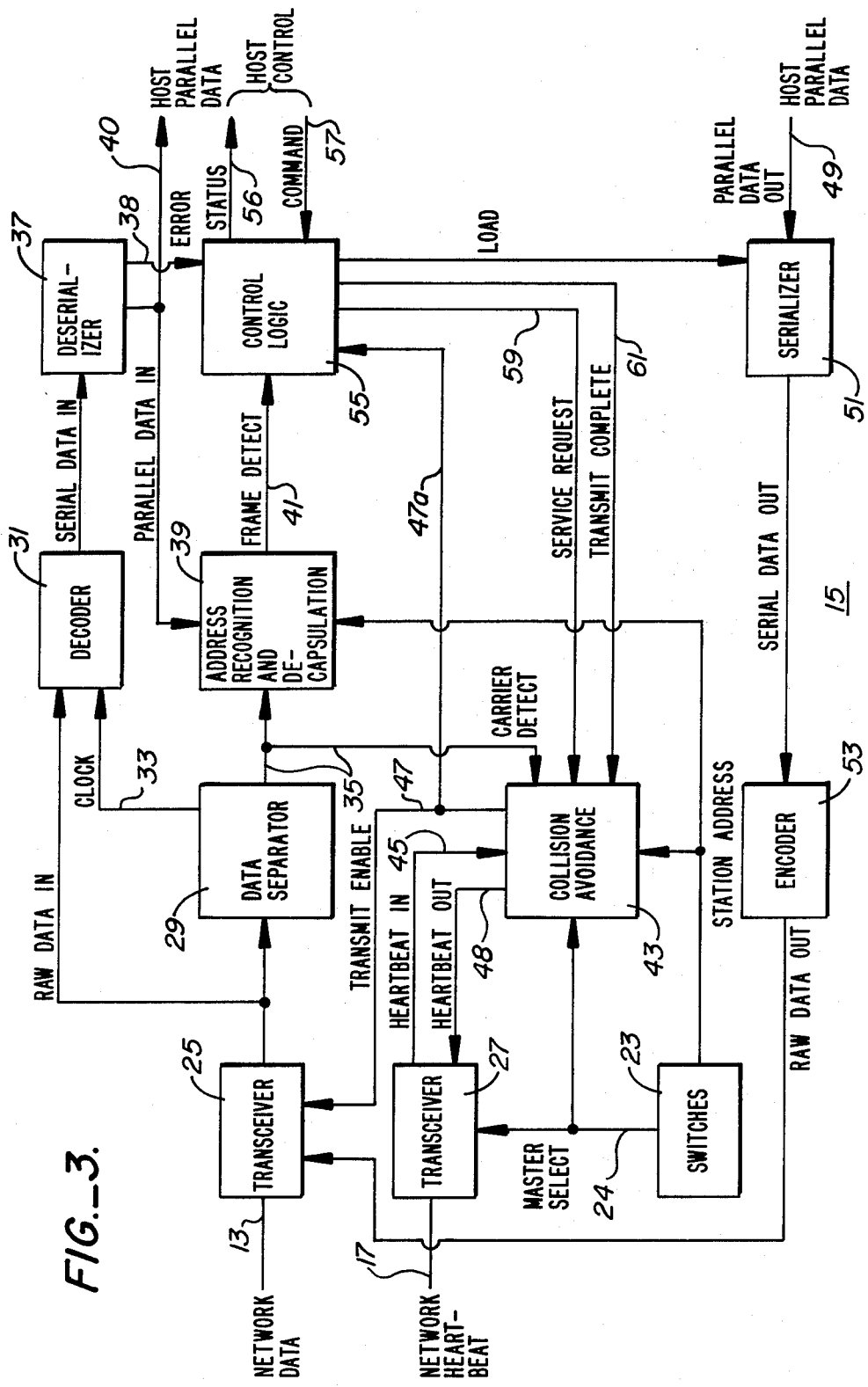
FIG._3.

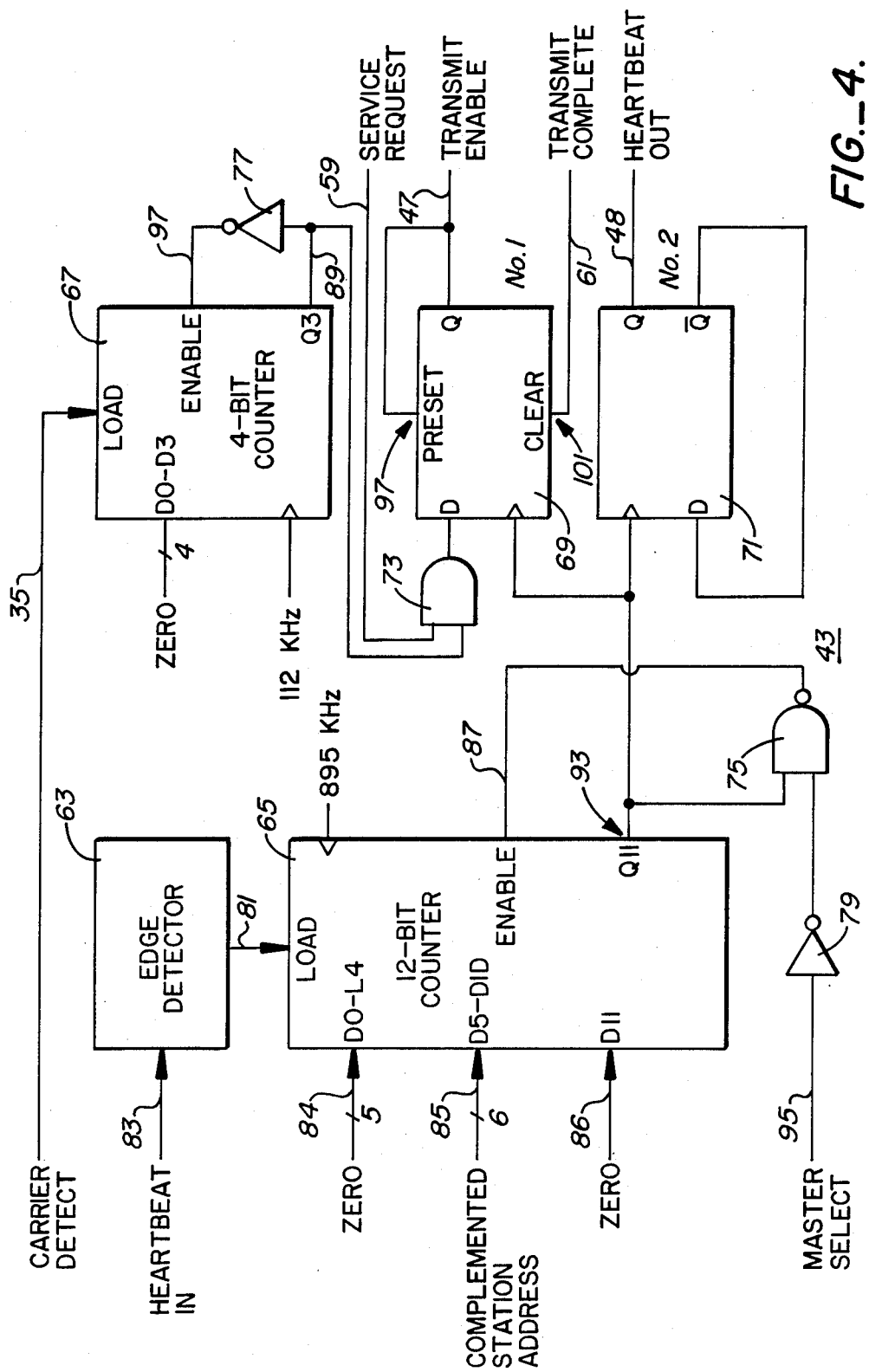
FIG._4.

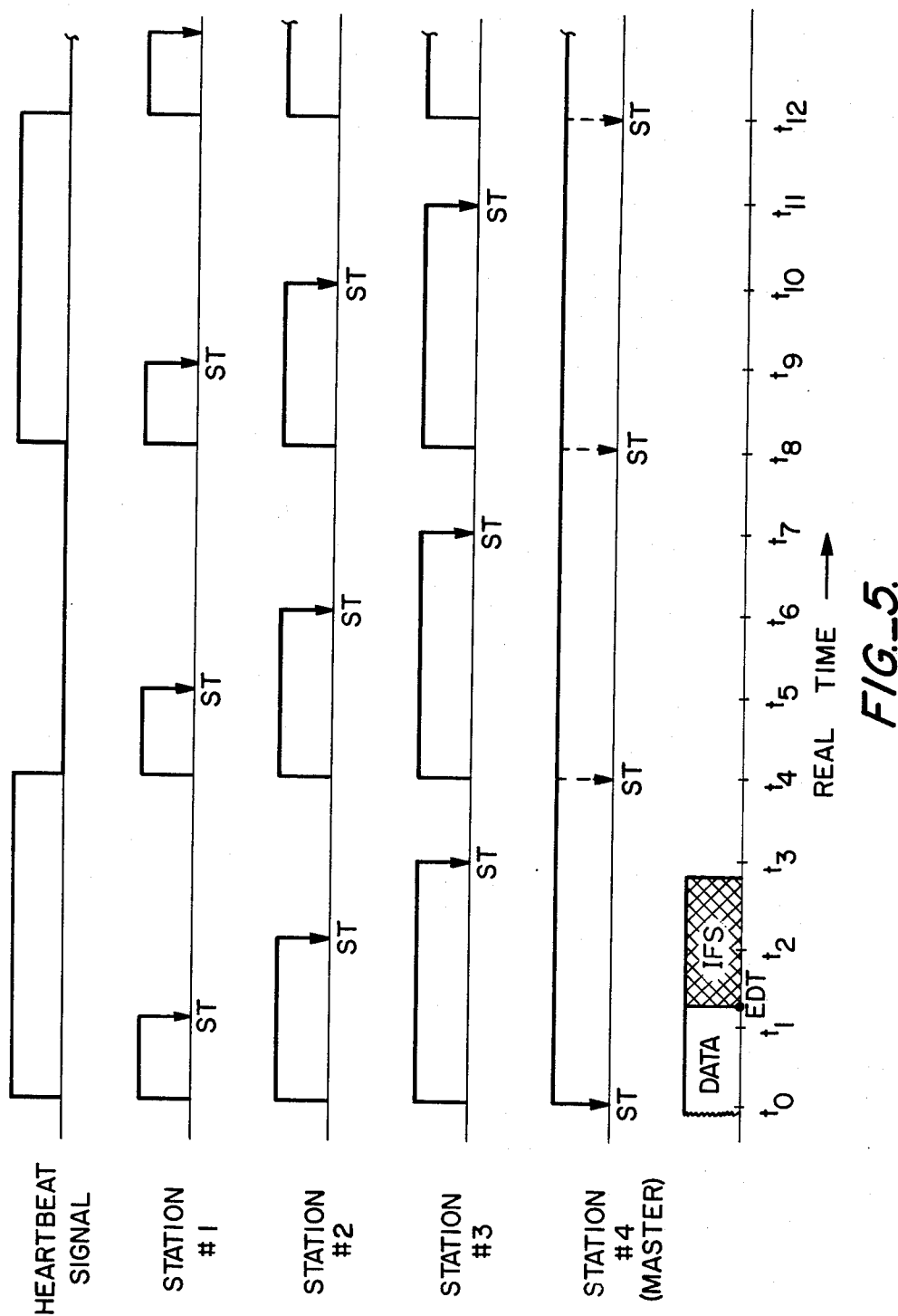
FIG._5.

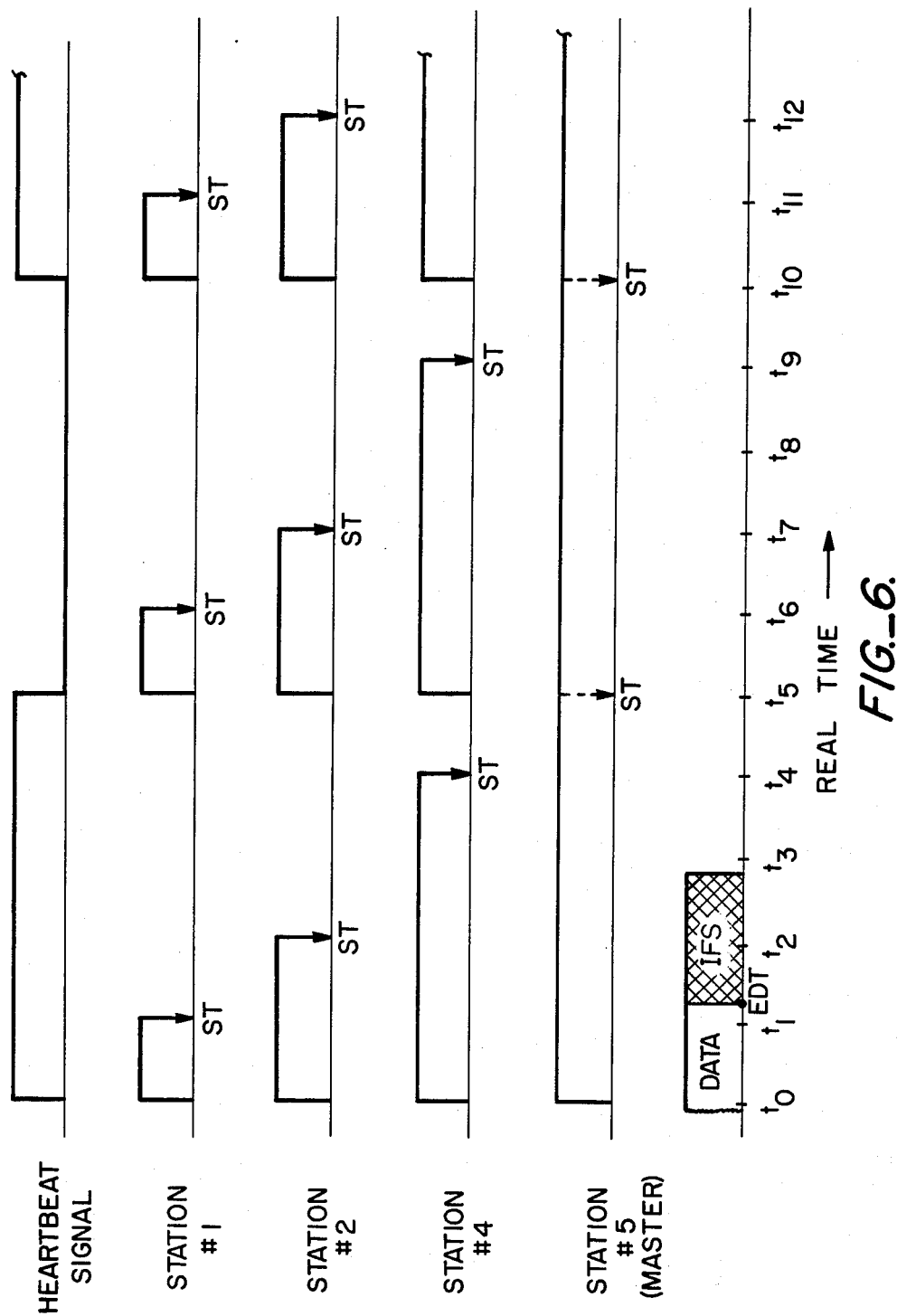

HEARTBEAT COLLISION AVOIDANCE METHOD AND CIRCUIT

This application is a continuation of application Ser. No. 06/871,460, filed June 5, 1986 now abandoned.

BACKGROUND OF THE INVENTION

The present invention generally relates to the networking of individual computer stations into a data communication system, and more particularly to regulating the access of computer stations to a common data communications link.

The desireability of networking several of computers or work-stations together in what is known as a local area network or "LAN" are well known. Linking equipment provides the capability of communicating between work stations, exchanging files, and simultaneously sharing data files. Also, large data files can be accessed by linking smaller computers to a large central computer. In a LAN different stand alone pieces of computing equipment are physically cabled together to provide a communications path over which data can be transmitted from one station to another. The key problem is how to efficiently regulate each station's access to the common data communications path in order to prevent more than one station from talking at once.

A number of access techniques and approaches have been devised, most of which use one or more of the following: "token passing", (2) "collision detection", (3) "collision avoidance", (4) a ring topology, or (5) a network controller.

Using a token passing technique, an electronic "token" is passed from station to station and the station having the token at any point in time is the only station allowed to transmit. U.S. Pat. No. 4,454,508 discloses a timed token protocol implemented on a physical or logical loop interconnecting a plurality of stations forming the LAN.

Collision detection schemes have special hardware to detect when two or more stations are transmitting at the same time. A collision detection protocol aborts the transmissions of all stations when a collision is detected. Collision detection is described in U.S. Pat. No. 4,380,761.

As its name implies, collision avoidance avoid simultaneous transmissions in the first instance by assigning each station of the LAN with a unique time slot during which it is permitted to transmit data. Under collision avoidance schemes, once a station has begun transmitting, it can continue to transmit for as long as it wants.

Using a ring topology the stations are not all connected to the same cable. Instead, each station is connected directly to the next station, and the last station is connected to the first station, thus forming a "ring" of stations. Data is passed around the network in "bucket brigade" fashion.

Finally, in the category denoted "network controller", one station exercises overall control of the network, serving as a controller that tells the other stations when they can transmit. The software in the controller lets only one station transmit at a time.

The aforementioned cable access schemes have a number of disadvantages. For example, networks using a collision detection protocol are highly sensitive to tap insertion loss and unbalanced signal strengths and are very sensitive in regard to the need to use matched cables and transmitters with strict specifications.

Conventional collision avoidance schemes are, on the other hand, inherently unfair. Using collision avoidance schemes heretofore known, stations with the first assigned time slot have priority over subsequent stations, with the last assigned time slot having the lowest priority. This is due to the fact that under previous collision avoidance schemes timeout clocks are provided at every station and each of these timeout clocks are restarted at the end of every data transmission. The first station, therefore, always has the first opportunity to transmit and can transmit as long as it wants, the second station has the second opportunity to transmit and can transmit as long as it wants, etc. Such systems are extremely impractical under most normal usage conditions since the lower priority stations do not have sufficient opportunity to access the system. Relatively complicated solutions have been devised for solving this problem, such as using a token which is assigned to establish priority between stations. Beyond its complexity, the use of tokens raises problems associated with agreeing what the token is and losing the token.

LAN systems cabled together in a ring topology generally avoid the above problems of complexity and fairness, however, ring topology systems including the timed token ring generally produce more idle time on the network and are inefficient in handling short burst like transmissions from a number of stations.

Generally, all of the above-mentioned accessing schemes involve relative degrees of complexity in their circuit implementations including the use of active processors. The currently used collision detection system known as the Ethernet system (described in the above-mentioned U.S. Pat. No. 4,380,761) has a particularly high degree of complexity, making it expensive and quite difficult to implement. The collision detection scheme of Ethernet also tends to become unstable and collapse at high utilization rates due to the fact that the collision algorithm is telling the work stations to wait longer and longer to avoid future collisions.

The present invention provides for a unique collision avoidance cable access regulation scheme which overcomes the above-mentioned major disadvantage of present regulation systems, that of high system complexity. In particular, the collision avoidance system of the present invention can be implemented by a relatively simple circuit board (with no processor) which plugs into each of the network's computer stations; the computers of the network provide the memory and central processing that are required to operate the collision avoidance protocol of, the invention. The present invention also overcomes a problem associated with collision avoidance type access schemes heretofore devised in that it provides all stations with fair and equal access to the network.

SUMMARY OF THE INVENTION

Briefly, the invention is a heartbeat collision avoidance method and system wherein access of two or more stations to a common network data communications path is regulated by allocating data transmission slot times to each of the network stations in reference to a continuous heartbeat signal that is independent of the system's data signal. Each station of the network is assigned a unique address and slot times are allocated to the station at timeout intervals initiated by the heartbeat signal and based on this station address; a network station can only begin transmitting data at its slot time. Because the heartbeat signal is transmitted to all stations of the network and because the allocation of the slot times to each station is synchronized to this heartbeat signal, the slot times will occur independently of data signal transmissions on the network. In other words, when a data transmission of any one station terminates and the network cable is freed for another transmission, the next available station slot time, that is the next station that is told it is free to transmit, will essentially be a random occurrence.

Thus, in the heartbeat collision avoidance scheme of the present invention, the cabling interconnecting the network stations, for example, two twisted pairs of an EIA RS 485 cable, will carry two separate signals, a data signal and a heartbeat signal. The heartbeat signal runs continuously, regardless of whether a data signal is being transmitted.

In the physical implementation of the invention, each of the network stations is provided with an adapter circuit having a timeout means which times out in reference to the heartbeat signal. In the illustrated and described embodiment, slot times are allocated by starting the timeout interval at each station upon detection of a transition in the heartbeat signal and causing the timeout, and hence the slot time allocation, to occur at a time which is the product of the station's assigned integer address and a minimum time interval that is determined to be the minimum practical spacing between slot times. However, it will be understood that other means for allocating slot times in reference to the heartbeat signal could be devised. One example would be to generate a long heartbeat pulse followed by a series of short heartbeat pulses. The slot times for each station could then be assigned by starting a counter when the long pulse is detected and then advancing the counter each time a short pulse is detected until the number of short pulses equals the stations pre-assigned address. The essential criteria is that every station of the network have different slot times synchronized to the heartbeat signal. The station is then allowed to begin a transmission when one of its slot time occurs, provided that the data signal on the network cable is inactive, and provided there is a suitable separation between data transmissions from different stations.

For the heartbeat collision avoidance protocol of the present invention to operate reliably it is necessary that there be a minimum time interval between the end of one transmission and the start of the next transmission over the network cable. Data is transmitted in a unit called a data "frame," the contents of which will be later described. The minimum time interval between data transmissions is therefore referred to as the "interframe spacing time." In accordance with the illustrated embodiment, a station can only begin transmitting on the network when both (1) its slot time occurs and (2) the data signal has been inactive for a period of time which is at least as long as the interframe spacing time.

The heartbeat signal itself can be generated by either a separate signal generator or by one of the network stations. In the latter case a heartbeat signal is generated by the station having the highest station address (the station addresses are set by the user through externally located switches). Also, this station, called a "master station", will preferably provide means whereby the master station does not cease generating a heartbeat signal upon the failure to detect its own heartbeat.

As earlier stated the present invention provides all the stations of a local area network with equal access to the network, a particular problem with conventional collision avoidance protocol. However, the heartbeat collision avoidance protocol of the invention has a further advantage in that priorities can be assigned to network stations based on the needs and desires of the user, this being done simply be manipulating station address assignments. Priorities are given by making the station addresses non-sequential; for example, by assigning station addresses 1, 2, 4 and 5, instead of 1, 2, 3, and 4, station 4 can be given a high priority access to the network.

Therefore, it can be seen that a primary object of the present invention is to provide a circuit and method for regulating the access of stations to a network of computer stations that eliminates the relatively complex protocols and circuit implementations of conventional access regulating schemes. Indeed, using the heartbeat collision avoidance protocol of the present invention, a number of personal computers can be linked together in a local area network using a relatively simple adapter card for interfacing between a computer input/output port and the network's common data transmission line. The upper limit on the number of stations that could be used would be governed by the electrical loading of each station on the data line. It is a further object of the invention to provide a protocol for permitting stations to access a data communications network at relatively high network utilization rates and with the opportunity for equal network access. And it is yet another object of the invention to provide a circuit and method for accessing a data communications network capable of operating without or with station access priorities. Other objects of the invention will be apparent from the detailed description of the embodiment of the invention illustrated in the accompanying drawings.

DESCRIPTION OF THE DRAWINGS

FIG. 1 is a pictorial illustration of a data communications network comprised of four stations having addresses 1 thru 4 interconnected by a data transmission path and a heartbeat signal path and wherein station No. 4 serves as a master station for producing a heartbeat signal.

FIG. 2 is illustrates a network of stations interconnected in a manner similar to FIG. 1, except that the heartbeat signal is generated by a separate signal generator and no station serves as a master station.

FIG. 3 is a schematic block diagram of the adapter circuit inserted at each station of the network of FIG. 1 for regulating data reception and transmissions and for implementing the heartbeat collision avoidance protocol of the invention.

FIG. 4 is a block diagram of the collision avoidance protocol circuit shown in FIG. 3.

FIG. 5 illustrates the allocation of transmission slot times for the different stations 1-4 of FIG. 1 in reference to a heartbeat signal and the interframe spacing time.

FIG. 6 illustrates the allocation of transmission slot times as in FIG. 5, except with priority given to one station of the network.

DETAILED DESCRIPTION OF ILLUSTRATED EMBODIMENTS

Referring now to the drawings, FIGS. 1 and 2 illustrate a data communications network comprised of four stations numbered 1 thru 4 connected to a common data communications path 13 through a special adapter circuit 15 associated with each of the stations 1-4. Each station will typically be a separate stand alone personal computer provided with a separate printed circuit board containing the adapter circuit which, as hereinafter described, will contain all the logic and communications hardware necessary to tell the host computer when to transmit and- receive data on the network and to implement the heartbeat collision avoidance protocol of the invention. Also shown in FIGS. 1 and 2 is a separate path 17 for transmitting the heartbeat signal to each of the stations 1-4 of the network. FIG. 1 illustrates a network wherein station No. 4, designated the "master" station, generates the heartbeat signal for the entire network, whereas in FIG. 2 there is no master station, but rather the heartbeat signal supplied by a separate signal generator denoted 19.

The actual physical medium which interconnects the stations 1-4 on the network will preferably consist of a four conductor cable which contains two twisted conductor pairs, both of which are driven using EIA standard RS-485 transceivers. One twisted pair of this cable will constitute the data pair and will carry serial data between transceivers on the adapter circuits of the network stations. The other pair is designated the heartbeat pair and will carry a heartbeat signal used to drive the collision avoidance algorithm of the system. The cable can be connected to the adapter circuit using modular phone plugs and jacks; by providing two jacks for each adapter, the stations can be daisy-chained together. The total length of the cabling will be limited by the time delay associated with transmitting signals through the network. To avoid unacceptable time delays, it is recommended that the total cable length be limited to approximately 400 meters. At the extreme end 16 of the cable, each twisted pair will be terminated by a suitable termination resistor.

Only one of the stations 1-4 of the network will be permitted to transmit data at any particular time, that is, the data signal on the data communications path 13 of the network cable 21 will be from a single transmitting station; if no station is currently transmitting then there will be no data signal and the cable will be "free". Data is transmitted from a station one bit at a time using biphase mark encoding (also known as FM encoding). In biphase mark encoding, there is a transmission at the start of each bit cell (known as a "clock transition"). A "1" bit is indicated by the presence of an additional transition at the center of the bit cell (known as a "data transition"), and a "0" bit is indicated by the absence of an additional transition at the center of the bit cell. Each bit cell is preferably 1.4 microseconds in duration.

Data on the cable will in turn be organized into bytes. Each byte will consist of a logic "1" start bit, followed by 8 data bits, followed by a parity bit, followed by a logic "0" stop bit. Optionally, there may be more than one stop bit.

Each data signal transmission by one of the network stations 1 thru 4 will contain one frame of data consisting of a preamble followed by a sequence of bytes ranging in number from 12 to 2,082. The preamble will be a string of "0" bits, preferably at least 3 milliseconds in duration. The first byte of the frame contains the address of the intended destination station, that is, the other station of the network to which the data transmitting station is communicating. Alternatively, the first byte of the frame can be a special value which indicates that the frame is a broadcast frame which should be received by all other stations.

As earlier stated, each station of the network is assigned an address by which that station can be identified within the data frame transmitted over the network cable. A six bit station address can be set by the user at the time the adapter circuit board is installed in the host computer. A suitable dip switch, designated as 23 in FIGS. 1 and 2, can be provided on the adapter circuit board for this purpose.

FIG. 3 illustrates the station's adapter board circuit. This circuit contains the communications hardware that essentially is responsible for the following functions: implementing the heartbeat collision protocol which controls the host computer's access to the network cable, recognizing and responding to its station address, and transferring a block of data from the host computer memory to the network cable or from the network cable to the host computer memory. The communications hardware on this circuit also generates (when transmitting) or checks (when receiving) parity for each byte of data transmitted, and detects the end of a data frame.

Referring to FIG. 3, the adapter circuit includes two transceivers 25, 27 which convert outgoing signals from the TTL levels used on the adapter board 15 to the EIA RS-485 signals used on the network cable 21, and which similarly convert incoming signals from EIA RS-485 levels to TTL levels. Transceiver 25 receives and transmits network data signals and transceiver 27 receives and transmits the network heartbeat signal. The output of the network data transceiver 25 is fed to a data separator 29 and to a decoder 30. The data separator is a digital phase-locked loop circuit, and when it is locked onto the data signal, it produces a clock output 33 which identifies the clock transitions (as opposed to the data transitions) on the network cable. Also a carrier detect signal 35 is asserted when the phase locked loop is locked on to the data signal.

The decoder 31 converts the biphase mark code of the incoming raw data signal into serial data. It operates by sampling the data signal immediately after each clock transition: when two successive samples agree, the decoder outputs a "1", and when two successive samples differ, the decoder outputs a "0". The serial data from the decoder is inputted to a deserializer 37 which is a shift register used to convert incoming serial data to parallel form. The deserializer also contains the logic to remove start bits, parity bits, and stop bits from the incoming data stream and to check for parity errors.

An address recognition and decapsulation circuit 39 examines the contents of the first byte of a frame as received from the deserializer 37 and checks to see if it matches the address of the station set by dip switches 23, or if it equals a special broadcast value. If either condition holds, the address recognition and decapsulization circuit asserts the frame detect signal 41. The frame detect signal is later deasserted when the carrier detect signal 35 goes inactive.

The collision avoidance protocol is implemented by circuit 43. This circuit receives the heartbeat signal 45 from the transceiver 27 and, as will be more fully described below, determines when the station is allowed to transmit data. In the case of a master station, such as station No. 4 shown in FIG. 1, the collision avoidance circuit 43 will also generate a heartbeat signal (denoted by numeral 48) which is put on the network cable by transceiver 27. The collision avoidance circuit also asserts a transmit enable signal 47 to transceiver 25 during the time the station is transmitting.

Transmissions from the host computer are inputted to serializer 51 on a parallel data bus 49; the serializer in turn outputs the data in serial form to an encoder 53 which converts the outgoing serial data into biphase mark code. The serializer 51 contains the necessary logic to add start bits, parity bits, and stop bits to the serial data stream.

The adapter circuit 15 interfaces with the host computer by means of the control logic circuit 55. The control logic receives commands from the host, sends status information to the host, and performs handshaking for data transfers.

The procedure for receiving a data frame at a network station through the adapter circuit can be described in reference to FIG. 3 of the drawings as follows: Reception of a frame begins with another station on the network transmitting the preamble to a data frame. The preamble comes in on the network data line 13, goes through the transceiver 25 to the data separator 29. When the data separator locks onto the preamble, it asserts the carrier detect signal 35 and begins sending a clock signal 33 to the decoder 31.

The assertion of the carrier detect signal 35 tells the address recognition and decapsulization circuit 39 that it is about to receive the first byte of a data frame. It also tells the collision avoidance circuit that another station is currently transmitting, thereby inhibiting this station from beginning a transmission.

Using the clock signal 33, the decoder 31 is able to convert the incoming biphase mark encoded data into serial data. So long as the preamble continues, the serial data will consist entirely of "0" bits. The first "1" bit produced by the decoder 31 is the start bit of the first byte in the frame and the succeeding 8 bits are then shifted into the deserializer for converting the first byte into parallel form. The next bit received is the parity bit; if the parity bit is incorrect the deserializer generates an error signal 38 which is applied to the control logic 55.

The first byte of the parallel data outputted by the deserializer 37 is sent to the address recognition and decapsulization circuit 39 to see if this is the right address or a special broadcast instruction. If neither of these conditions are met, then no further action is taken and the network adapter circuit remains idle until the next data frame is received. If, on the other hand, either condition is met, the address recognition and decapsulization circuit asserts the frame detect signal 41, which causes the control logic to instruct the host computer to start receiving data. The first parallel byte of information is then transferred into the memory of the host computer on the parallel data bus 40.

Thereafter, each succeeding byte of the data frame enters the station's adapter circuit through the transceiver 25, is converted from biphase mark encoded form to serial form by the decoder 31, and is passed through the deserializer before being transferred to the host's memory.

The transmitting station will stop transmitting after the last byte of a data frame is sent. Since there will no longer be a data signal on which the receiving station or stations can lock onto, the data separator 29 of the receiving station's adapter circuit 15 will stop generating the clock signal and will deassert the carrier detect signal 35. The deassertion of the carrier detect signal causes the address recognition and decapsulization circuit 39 to deassert the frame detect signal 41, which in turn causes the control logic 55 to inform the host computer via a status line 56 that frame reception is complete.

The procedure for transmitting a data frame via the adapter circuit 15 is as follows: The frame transmission begins when the host computer sends a command via a command input 57 to the control logic indicating that it (the host computer) has a frame available for transmission. This will cause the control logic to send a service request signal 59 to the collision avoidance circuit 43. The collision avoidance circuit continuously monitors the carrier detect signal 35 to determine when a data transmission is in progress. It also continuously monitors the heartbeat at input 45 to determine in a manner later described, when this station's transmission slot times occur. At each slot time for this station, the collision avoidance circuit 43 checks to see if (a) there is no data transmission in progress, and (b) the service request signal is active. If both of these conditions are met, the collision avoidance circuit activates the transmit enable signal 47 that is applied to transceiver 25.

The transmit enable signal 47 will turn on the transmitter portion of the transceiver 25 causing the serial biphase mark encoded data from encoder 53 to be transmitted onto the network data line 13. Initially, the data stream will be entirely "0" bits. This is accomplished by the serializer 51 which is initialized to "0".

The transmit enable signal 47 is also applied at 47a to the logic control circuit and causes the logic control to send a signal to the host computer via input 56 indicating that a transmission has begun. When the host computer receives the signal, it will delay for a short transmission delay interval, preferably about 3 milliseconds, before taking any action so as to allow the adapter circuit 15 of the host computer to transmit the preamble to the data frame. At the end of the delay, the host computer starts sending data to the adapter circuit, one byte at a time, via the data bus input 49, where it is converted to serial form and biphase mark encoded form before it is sent to the transceiver 25.

When the last byte of a data frame has been transmitted, the host computer sends a signal via 57 to the control logic 55, which in turn generates a transmit complete signal 61 which is applied to the collision avoidance circuit 43. This causes the collision avoidance circuit to deactivate the transmit enable signal thereby terminating the transmission of the frame.

Turning to FIG. 4 of the drawings, the collision avoidance circuit 43 is comprised of an edge detector 63, a 12-bit counter 65 which is clocked by a continuous 895 KHz signal, a 4-bit counter 67, which is clocked by a continuous 112 KHz signal, two D-type flip-flops 69, 71, an AND gate 73, a NAND gate 75, and two inverters 77, 79. The edge detector 63 produces a "1" output at 81 of short duration whenever there is a transition (either "0" to "1" or "1" to "0") on its input 83. Where is "0" to "1" transition on the clock input to the counter, the counter acts as follows: (a) if the load input 81 is "1", the contents of the counter is made equal to the counter's data inputs 84, 85, and 86 (pins D0–D11) (note that the binary complement of the station address set by the dip switch 23); (b) if the load input 81 is "0" and the enable input 87 is "1", the counter increments; (c) if the load input 81 and the enable input 87 are both "0", then the contents of the counter remains unchanged. Counter 67 operates in a similar manner.

As above-mentioned, for the heartbeat collision avoidance protocol to work reliably, a station must not begin transmitting until a fixed time after the last data transmission on the network. This delay time, defined as the interframe spacing time, is implemented in the FIG.

4 circuit by the 4-bit counter 67 which acts as a timeout circuit triggered by the end of a data transmission. The Q3 output 89 of this counter is "1" when the network data line is free. Whenever the carrier detect signal 35 is active, the 4-bit counter 67 is loaded with "0" bits, thus setting the Q3 output 89 to "0" and indicating that the network data line is not free. When the carrier detect signal becomes inactive, the 4-bit counter starts to count, and after 8 counts, the Q3 output becomes "1" indicating that the interframe spacing time has passed and that somebody can now transmit on the network data line 13. Also, when Q3 becomes "1", at the end of the interframe spacing time, the enable input 91 to the 4-bit counter becomes "0" because of the presence of the inverter 77. Thus, after the interframe spacing interval, the 4-bit counter is prevented from incrementing further. When the network data line 13 sees another transmission the carrier detect signal 35 becomes active again, whereupon the 4-bit counter is again reset to "0". Assuming a suggested 62 microsecond interframe spacing time, the 4-bit counter will not release the network data line 13 for a transmission until at least 62 microseconds after the carrier detect signal 35 goes inactive. This insures that there is a gap of at least 62 microseconds between successive frames transmitted on the network data line 13.

The 12-bit counter 65, which acts as a timeout circuit triggered by the heartbeat signal for allocating the transmission slot times for the host computer, operates as follows: when the Q11 output 93 transitions from "0" to "1" the host station'slot time occurs. Whenever there is a transition of the heartbeat signal at 83, the edge detector 63 generates a "1" output, which causes the 12-bit counter 65 to be loaded with the value on its data inputs 84, 85, 86. It is noted that the inputs 84 for the 5-low order data bits are "0", that as above-mentioned the data inputs 85 for the next 6 data bits are the logical compliment of the station address, and that the input 86 for be high order data bit D11 is "0". The "0" input at the high order data bit D11 causes the Q11 output 93 to assume the value "0". After data inputs are loaded, the counter begins to count: a number of counts required for Q11 to change from "0" to "1" is, in this case, 32 times the station address. The time interval between the transition of the heartbeat signal detected by edge detector 63 and the transition of Q11 can suitably be 36 microseconds times the station address. This interval defines when the station's slot time occurs.

After the Q11 output 93 of the 12-bit counter becomes "1", the subsequent behavior of the counter varies depending on whether or not the station is a master station. If the station is not a master station, then the master select signal 95 is "0", and so the enable input 87 of the counter is "0", since both inputs to the NAND gate 75 are both "1". The high level output from the NAND gate under this condition will prevent the counter from counting any further until the next transition of the heartbeat signal.

If on the other hand the host station is a master station (e.g. station No. 4 in FIG. 1), then the master select signal 95 is set to a "1" value, so that the enable signal 87 remains "1" regardless of the status of the Q11 output 93. Therefore, the 12-bit counter of the master station continues to count after the timeout of the counter. This ensures that the master station will always generate the heartbeat signal, even if the master is unable to receive the heartbeat signal. The master station must be assigns the highest address since the next heartbeat transition will be generated when the master station times out. If there is a station with a higher address, its counter will not time out before it is reset by a new heartbeat transition and therefore a time slot for that station will never be generated.

The transmit enable and heartbeat signals 47, 48 are produced from two D-type flip-flops designated, respectively by numerals 69 and 71. Flip-flop 69 is clocked when the Q11 output 93 changes from "0" to "1", i.e., at the occurrence of this station's slot time. When flip-flop 69 is clocked, its output will become "1" provided that (a) the service request signal 59 from the control logic 55 is active, indicating that the host computer is ready to send a frame, and (b) the Q3 output 89 of the 4-bit interframe spacing counter 67 is "1", indicating that the network data line 13 is free. If either of these conditions fails to held, the transmit enable signal 47 will remain "0" until the next time the flip-flop 69 is clocked, i.e., until the next slot time occurs.

It is seen in connection with flip-flop 69 that the transmit enable signal 47 is connected back to the flip-flop's preset input 97. Therefore, once transmit enable becomes "1", it will remain "1" regardless of the flip-flop's D-input 99. The control logic 55 of the adapter circuit will generate a transmit complete signal 61 when the host computer's transmission is complete. The transmit complete signal is applied to the clear input 101 of flip-flop 6, whereupon this flip-flop is cleared and the transmit enable signal 47 returns to "0". Thus, once a transmission commences during the station's allocated slot time, the station is permitted to continue its transmission until it is complete. When complete, the network data line 13 will be free, permitting the stations to gain access to the data line during their slot times (and after the required interframe spacing).

It is seen that opportunities for access to the data line will occur randomly among the network stations because the completion of data frame transmissions occur randomly. Therefore, assuming station addresses are assigned sequential integer addresses, all stations will have equal access to the network. On the other hand, by manipulating the station addresses certain stations can be given priority as will be described more fully below.

In the case of a master station (station No. 4 of FIG. 1) flip-flop 71 will produce the heartbeat signal 48. When Q11 changes from "0" to "1", the Q output 48 of this flip-flop changes state (either "0" to "1" or "1" to "0"). Thus, the transition of the heartbeat signal occurs concurrently with the occurrence of the master stations slot time. In the case of a non-master station (stations 1, 2, and 3 of FIG. 1) flip-flop 71 performs no function. The master select switch at 23 will be off in this case and the transmitter portion of transceiver 27 disabled.

FIG. 5 illustrates the timing of transmission slot times of stations 1–4 of the FIG. 1 network in reference to the heartbeat signal generated by the network's master station 4. First, it can be seen in FIG. 5 that the transition of the heartbeat signal coincides with the slot time for the master station since the heartbeat is being transmitted by this station as its slot time is being allocated by the timeout of the counter 65. It is also seen that each of the stations 1–3 time out before the time out of the master station since the time out is determined by the product of a fixed time interval and the station address. Again, the master must have the highest station address so that all nonmaster stations will time out before the master generates another transition on the heartbeat pair of cable 21. However, assigning a large station address to the master will increase the period of the heartbeat signal and thereby reduce the overall performance of the network.

Consider now the first heartbeat transition of the heartbeat signal shown in FIG. 5. With this transition each of the counters of the associated adapter circuits for stations 1-4 senses the transition and, after being initialized, begins counting, that is, timing out, for a timeout interval based on its station address. This is represented in FIG. 5 or each of the stations 1-4 by the timeout pulse waveforms, the falling edges of which represent the respective station's transmission slot time (ST). For example, at station 2, a slot time occurs at time $t_2$; at time $t_2$ flip-flop 69 of the collision avoidance circuit 43 of this station's associated adapter circuit will assert a transmit enable signal 47 provided (a) the adapter control logic issues a service request 59, and (b) the collision avoidance circuit 4-bit counter indicates at its Q3 output 89 that the interframe spacing condition has been satisfied. In FIG. 5 it can be seen that an end data transmission (EDT) occurs between $t_1$ and $t_2$ and that the interframe spacing time indicated as being required extends to between $t_2$ and $t_3$. Therefore, at the first slot time ST for station No. 2, the second condition for generating a transmit enable signal 47 from the collision avoidance circuit has not been satisfied, and this station must wait until its next time slot occurs at $t_6$ before it is again entitled to transmit.

On the other hand, station No. 3 in FIG. 5 first times out at time $t_3$. Therefore, the collision avoidance circuit associated with this station at $t_3$ can begin transmitting if it has a service request since $t_3$ falls outside the interframe spacing requirement. If station 3 has no data to transmit, the service request signal will be "0", and the station will have to wait until its next slot time occurring at $t_7$.

It is noted that the slot times i FIG. 5 are evenly spaced apart at times $t_0$, $t_1$, $t_2$, etc. This spacing represents at least the minimum slot time internal required to let a station determine that another station is not transmitting.

Consider now the assignment of station addresses s shown in the timing diagram of FIG. 6, that is, instead of assigning station numbers with sequential numbers 1, 2, 3, and 4, the stations are assigned addresses 1, 2, 4, and 5. With this assignment of station addresses, effective priority is given to station No. 4 since the time interval between the slot time for station No. 4 and the previously occurring slot time of station No. 2 is longer than the intervals between the slot times of the other remaining stations on the network. With this longer interval, station No. 4 has more time in which the interframe spacing condition can be fulfilled.

However, it is seen from FIG. 6 that the increase of the station addresses for the last two stations required to achieve this priority condition also increases the period of the heartbeat signal generated by master station. Therefore, as above-mentioned, there will be a trade-off between the performance of the network in terms of cycling speed and the desire to assign station priorities.

Referring again to FIG. 3 of the drawings, the adapter circuit will contain protocol software in a ROM memory chip (not shown) which accepts commands from application programs in the host computer and which uses the facilities of the communications hardware in the adapter circuit to perform the necessary commands from the application's programs. The control logic 55 of the adapter circuit will be contain the necessary status and control registers to permit an interface between the protocol software and the hardware components on the adaptor circuits. The manner of implementing the control logic for interfacing with the host computer would be well known to persons skilled in the art.

Therefore, it can be seen that the present invention is a system and method for interconnecting a plurality of independent computer stations into a data communications network by providing separate conducting paths for data signals and a heartbeat signal and by providing each computer station with an adapter circuit which allocates unique transmission slot times to each of the stations of the network in reference to transitions of the independent heartbeat signal. As has been seen, the adapter circuit which regulates the access of each station to the data communications path is a relatively simple circuit made up of readily available solid state components and which does not require its own microprocessor. The circuit provides the further particular advantage of permitting each station fair and equal access to the network while permitting priority access if desired. Although the invention has been described in considerable detail in the foregoing specification, it will be understood that it is not intended that the invention be limited by such detail, except as necessitated by the following claims.

What I claim is:

1. A method for regulating access of two or more stations to a common data communications path interconnecting said stations in a data communications network, each of said network stations having a preassigned address, means for transmitting to said network data communications path a data signal addresses to other of said stations, means for receiving from said network data communications path data signals addressed to it from other network stations, and means for allocating data transmission slot times to said station which are unique to said station and which determine when said station can begin to transmit a data signal to said network data communications path, said method comprising the steps of (a) transmitting continuous heartbeat signals to all of said network stations independently of data signals transmitted and received by said stations,
   (b) synchronizing the slot time allocation for said network stations to said heartbeat signal,
   (c) permitting each of said network stations to begin a data signal transmission to said network data communications path only at the slot times allocated to said station and only when the following data signal collision avoidance condition exists: there is no data signal transmission on said data communications path, and there has been a minimum defined interval between a slot time for said station and the end of a previous data transmission, and
   (d) permitting the end of the data signal transmission of said network stations to occur randomly in respect to said network station slot times whereby satisfaction of said data signal collision avoidance condition at the slot times for any of said network stations is a random event independent of said heartbeat signal.

2. The method of claim 1 wherein said heartbeat signal is generated by one of said network stations which serves as a master station.

3. The method of claim 2 wherein said heartbeat signal is generated at the allocation of slot times for said master station, and said master station is assigned an address whereby all other network stations see a slot time before the occurrence of a new heartbeat signal.

4. The method of claim 1 wherein the heartbeat synchronized slot times are allocated in reference to said station addresses.

5. The method of claim 1 wherein said heartbeat signal is generated by an external signal generator.

6. The method of claim 1 wherein said heartbeat signal is a continuous wave having detectable edge transitions and wherein said slot time allocations are synchronized said edge transitions.

7. The method of claim 6 wherein said slot times occur at a timeout interval following the detection of a transition of said heartbeat signal, said timeout interval being determined by the network stations preassigned address.

8. The method of claim 1 wherein the slot times of said stations are separated by at least a minimum predetermined slot time interval which permits a station whose transmission slot time has arrived to determine whether the station with the previous slot time has begun a data signal transmission.

9. The method of claim 8 wherein the slot times for each station of said network are allocated based on timeout intervals initiated by said heartbeat signal, the duration of said timeout intervals being a multiple of said minimum slot time interval and said station address.

10. The method of claim 9 wherein at least one station of said network is assigned an address whereby the slot time interval between said station and the network station with the previous allocated slot time is longer than the minimum slot time interval between other stations of said network whereby priority is given to at least said one station.

11. The method of claim 2 wherein the heartbeat signal is a continuous square wave, the period of which is determined by the address of said master station, wherein the slot times of said stations appear in order of said station addresses, and wherein said master station is assigned the highest address.

12. An adapter circuit for regulating access of a host station to a network of stations interconnected by two communication paths defined as a data communications path for conducting network data signals and heartbeat communications path for conducting a heartbeat signal and wherein each station of said network is given a unique preassigned station address, and wherein the end of the data signal transmission of said network stations is a random event independent of said heartbeat signal, said adapter circuit comprising means for detecting the end of a data signal transmission on said data communications path, means for detecting a heartbeat signal on said heartbeat communications path, means for allocating transmission slot times for said host station in reference to both said network heartbeat signal and the station address of said host station, and means for enabling said host station to begin transmitting data on said data communications path only at slot times allocated to said station provided the following data signal collision avoidance condition exists; there is no data signal transmission on said data communication path by other stations of said network and there has been a minimum time interval defined as the interframe spacing time between a given slot time and the end of a previous at a transmission on said data communications path.

13. The adapter circuit of claim 12 further comprising switch means for permitting a user to select the address of said host station.

14. The adapter circuit of claim 12 further comprising means for generating a heartbeat signal, switch means for selectively actuating said heartbeat signal means whereby said host station can be selected to provide a heartbeat signal on said heartbeat communications path for said network of stations.

15. The adapter circuit of claim 12 wherein said heartbeat signal is a square wave signal having edge transitions, said heartbeat signal detection means detects said edge transition, and said slot time allocation means allocates slot times in reference to said detected edge transitions.

16. The adapter circuit of claim 12 wherein said slot time allocation means includes a first timeout circuit adapted to be triggered by the detected heartbeat signal and which times out for a time out interval determined by the address of said host station, said timeout circuit having an output which is asserted at the end of said timeout interval to establish a slot time whereby a different station address will produce different slot times.

17. The adapter circuit of claim 16 wherein said time out circuit is comprised of a counter device having a heartbeat signal detection input for initializing said counter device, address data inputs representing said host station address, and an output which is asserted for enabling said host station to begin a data transmission when a count is reached as determined by said address data inputs.

18. The adapter circuit of claim 17 further comprising means for generating a heartbeat signal in response to the asserted output of said counter device, heartbeat transmitting means for applying said heartbeat signal to the heartbeat communications path of said network, switch means for selectively actuating said heartbeat transmission means whereby said host station provides the heartbeat signal for said network of stations.

19. The adapter circuit of claim 16 wherein said means for enabling said host station to begin transmitting data at said given slot time includes a second timeout circuit, said second timeout circuit adapted to be triggered when a data transmission on said data communications path ends, and having an output which is asserted after an interframe spacing time to enable said host station to transmit.

20. The adapter circuit of claim 19 wherein said means for enabling said host station to begin transmitting data is responsive to the outputs asserted by said first and second timeout circuits and to a service request indicating that said host computer is ready to transmit data.

21. An adapter circuit for regulating access of a host station to a network of stations interconnected by two communication paths defined as a data communications path for conducting network data signals and a heartbeat communications path for conducting a network heartbeat signal and wherein each station of said network is given a unique preassigned station address, and wherein the end of the data signal transmissions of said network stations is a random event independent of said heartbeat signal, said adapter circuit comprising
- means for detecting a data signal on said communications path,
- means for detecting a heartbeat signal on said heartbeat communications path,
- switch means for permitting a user to select the address of said host station,
- means for generating a heartbeat signal,
- switch means for selectively actuating said heartbeat signal whereby said host station can be selected to provide a heartbeat signal on said heartbeat communications path for said network of stations,
- a first timeout circuit having an input from said heartbeat detection means and adapted to being periodically triggered by the detected heartbeat signal of said network, and which times out for a timeout interval determined by the address of said host station, said timeout circuit having an output which is asserted at the end of said timeout interval to establish a transmission slot time for said host station,
- a second timeout circuit having an input from said data signal detection means and adapted to being triggered when a data transmission on said data communications path ends, nd having an output which is asserted after a minimum timeout interval, defined as the interface spacing time, between a given slot time and the end of a previous data transmission on said data communications path,
- means for enabling said host station to begin transmitting data in response to the outputs asserted by said first and second timeout circuits and to a service request indicating that said host computer is ready to transmit data.

22. A data communications network comprising
- at least two stations capable of transmitting data on said network,
- means for generating a heartbeat signal,
- a common data communications path and a common heartbeat communications path to which the stations of said network are connected,
- means whereby the stations connected to said common data communications path can transmit data to other stations connected to said data communications path,
- means whereby said heartbeat signal is transmitted to each station connected to said common heartbeat communications path,
- means for allocating different data transmission slot times to each of said network stations,
- means for synchronizing said slot time allocation means to said heartbeat signal,
- means for enabling the stations of said network to begin transmitting data on said data communications path only at the slot times allocated to said stating provided the following data signal collision avoidance condition exists: there is no data signal transmission on said data communications path by other stations of said network, and there has been a minimum time interval, defined as the interframe spacing time, between a given slot time and the end of a previous data transmission on said data communications path, and
- means whereby the end of the data signal transmissions of said network stations are permitted to occur randomly in respect to said network station slot times whereby satisfaction of said data signal collision avoidance condition at the slot times for any one of said network stations is a random event independent of said heartbeat signal.

23. The data communications network of claim 22 wherein one of the stations of said network provides the means for generating the heartbeat signal for said network.

24. The data communications network of claim 22 wherein said stations have unique preassigned addresses and wherein said slot time allocation means allocates slot times at heartbeat synchronized timeout intervals determined for each station of the network in accordance with the station's address.

* * * * *

UNITED STATES PATENT AND TRADEMARK OFFICE
CERTIFICATE OF CORRECTION

PATENT NO. : 4,860,006

DATED : August 22, 1989

INVENTOR(S) : Michael Barall

It is certified that error appears in the above—identified patent and that said Letters Patent is hereby corrected as shown below:

Column 8, line 54, should be --there-- at beginning of line.

Column 9, line 31, "station'slot" should be --station's slot--.

Column 10, line 17, "held" should be --hold--.

Column 10, line 28, "6," should be --69--.

Column 10, line 33, "the" should be --other--.

Column 10, line 58, "time" should be --times--.

Column 11, line 37, "i" should in --in--.

Column 11, line 42, "s" should as --as--.

Column 12, line 46, "allocation" should be --allocations--.

Column 13, line 67, "communication" should be --communications--.

Column 14, line 2, "at a" should be --data--.

UNITED STATES PATENT AND TRADEMARK OFFICE
CERTIFICATE OF CORRECTION

PATENT NO. : 4,860,006

DATED : August 22, 1989

INVENTOR(S) : Michael Barall

It is certified that error appears in the above-identified patent and that said Letters Patent is hereby corrected as shown below:

Column 15, line 29, "nd" should be --and--.

Signed and Sealed this

Third Day of April, 1990

*Attest:*

HARRY F. MANBECK, JR.

*Attesting Officer*   *Commissioner of Patents and Trademarks*